United States Patent [19]

Piette

[11] 4,048,717

[45] Sept. 20, 1977

[54] APPARATUS FOR ASSEMBLING AN ENCAPSULATED WET MOTOR CIRCULATOR

[75] Inventor: Leonard A. Piette, Warwick, R.I.

[73] Assignee: Unipas, Inc., Warwick, R.I.

[21] Appl. No.: 733,758

[22] Filed: Oct. 19, 1976

Related U.S. Application Data

[62] Division of Ser. No. 681,736, April 29, 1976, Pat. No. 4,023,261.

[51] Int. Cl.² .............................................. H02K 15/14
[52] U.S. Cl. ....................................... 29/732; 29/234;
29/596; 156/423; 310/42
[58] Field of Search ............. 29/596, 598, 234, 205 R, 29/732; 156/294, 423; 310/42, 86, 87, 90, 261

[56] References Cited

U.S. PATENT DOCUMENTS

| | | | |
|---|---|---|---|
| 3,538,598 | 11/1970 | Wightman et al. | 29/596 |
| 3,753,281 | 8/1973 | Arlt et al. | 29/732 |
| 3,867,658 | 2/1975 | Dochterman | 310/71 |
| 3,892,034 | 7/1975 | Arakelov et al. | 29/596 |
| 3,911,300 | 10/1975 | Lebkuchner | 29/598 X |

*Primary Examiner*—Carl E. Hall

*Attorney, Agent, or Firm*—Lane, Aitken, Dunner & Ziems

[57] ABSTRACT

A method and apparatus are disclosed for assembling a rotor mounted on a shaft and a plurality of bearing support members, each of which includes bearings, within an encapsulated sleeve in precise axial alignment for use in a wet motor circulator. A curable adhesive is applied to a predetermined location on the interior surface of the sleeve determined by the prospective location of a bearing support member therein. The bearing support members are positioned on the shaft on each side of the rotor, and the rotor and bearing support members are fixed as a subassembly in a curing fixture adapted to maintain alignment of the rotor with each of the support members. A curable adhesive is applied to the other bearing support member and the subassembly is axially aligned relative to the sleeve on a common axis in an assembly fixture. The sleeve is forceably ejected from the retaining portion of the assembly fixture to be secured about the subassembly to form the precisely axially aligned encapsulated assembly of components for use in a wet motor circulator. The apparatuses used for performing the assembly steps are also disclosed.

4 Claims, 10 Drawing Figures

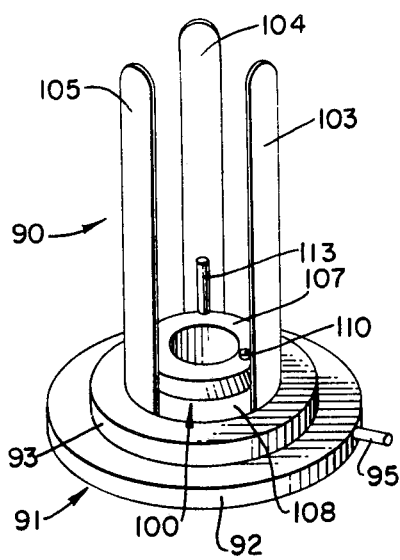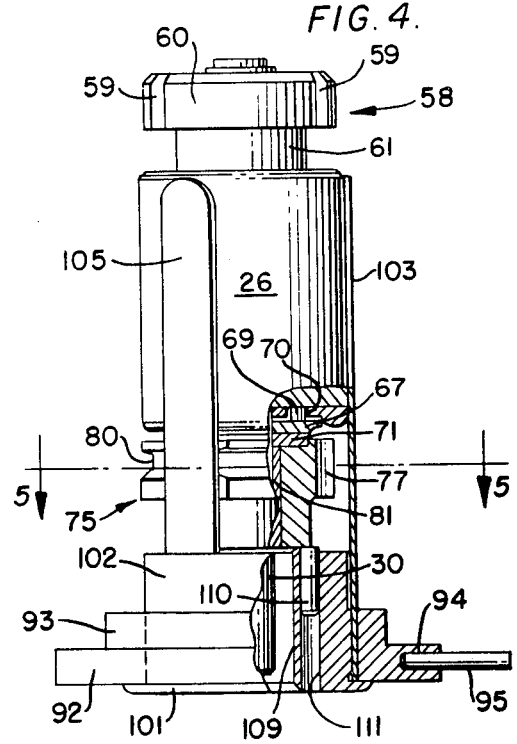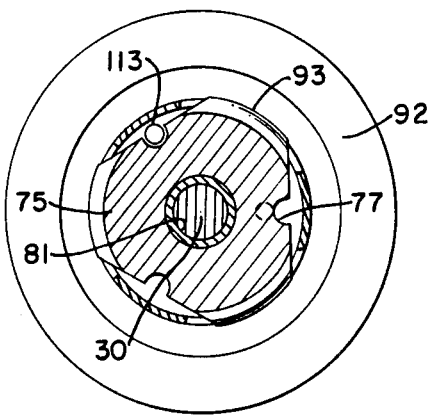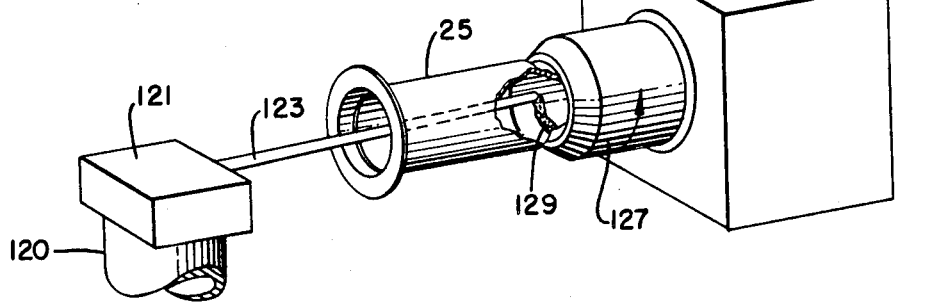

APPARATUS FOR ASSEMBLING AN ENCAPSULATED WET MOTOR CIRCULATOR

This is a division, of application Ser. No. 681,736 filed Apr. 29, 1976, now U.S. Pat. No. 4,023,261.

BACKGROUND OF THE INVENTION

This invention relates to a method and apparatus for assembling a subcombination of components for use in manufacturing a wet motor circulator. More particularly, this invention relates to a method for assembling an encapsulated sleeve about a subassembly comprising a rotor mounted on a shaft and a plurality of bearing support members, each of which includes bearings, positioned on each side of the rotor about the shaft while the subassembly is fixed in an assembly fixture. Still more particularly, this invention relates to an improved method and apparatus for assembling such a combination of components by the use of an assembly fixture which includes means for maintaining the sleeve in axial alignment with the subassembly which is axially fixed and aligned in an assembly fixture while the subassembly is axially positioned in a curing fixture mounted on the assembly fixture and for forceably ejecting the sleeve to encapsulate the subassembly when so positioned.

An encapsulated wet motor circulator and a method for assembling such a circulator are known to the art. The wet motor circulator ultimately produced by a method known to the art is substantially similar to the structure herein. Briefly, the wet motor circulator of the type described includes an arrangement in which the rotor of the electric motor is supported within a sleeve which is isolated from the stator. Bearing support members on either side of the rotor are structurally located within the sleeve to form a subassembly of components for the circulator.

In the method for making a wet motor circulator according to the art, the rear bearing support member is first fixedly secured within the sleeve by a curable adhesive and then the adhesive is cured. Thereafter, the shaft of the rotor is inserted into the secured rear bearing support member and the front bearing support member, having adhesive applied to the outer surface of the front bearing support member, the shaft and the rotor are consecutively positioned within the sleeve for subsequent curing in a curing fixture. While that method of manufacturing presented a number of significant advantages over the prior art, it remained a problem to assemble the subcombination of components within the container and apply the container thereto using a single curing step rather than by requiring a two-step curing process as described above. Moreover, by first securing the rear bearing support member within the sleeve, certain problems of ultimate alignment occurred with respect to the entire subassembly because the position of the rear bearing support member ultimately determined in large measure the axial alignment of the components within the sleeve. Thus, it is an aim of this invention to provide a method for assembling a subcombination of a rotor and shaft and the associated bearing support members, including bearings, within a sleeve for use in a wet motor circulator with a single curing step while providing precise axial alignment of the components.

Accordingly, it is a broad objective of this invention to provide an improved method of assembling a subcombination of components for use within a wet motor circulator.

It is another objective of this invention to provide a method for assembling a subcombination of components of a wet motor circulator by using a curing fixture both for retaining the rotor and a pair of associated bearings in precise axial alignment while an encapsulating sleeve member is positioned about the subassembly and for maintaining such precise alignment while curing.

It is another objective of this invention to provide a method and apparatus for manufacturing such subassembly by applying curable adhesive to a first bearing support member, aligning the sleeve on an axis defined by the shaft of a subassembly of components comprising the rotor and the supporting bearings, forceably ejecting the sleeve from an assembly fixture to envelop the component subassembly in a precise axial relationship and subsequently curing the adhesive while maintaining such alignment.

It is still another objective of this invention to provide apparatuses for conveniently practicing the method of assembly thus described.

These and other objectives of this invention will become apparent from the following detailed written description of the invention taken in conjunction with the accompanying drawings.

BRIEF SUMMARY OF THE INVENTION

Directed to overcoming the aforementioned problems of alignment and achieving the aims and objectives of this invention for providing a rapid and convenient method of assembling a subcombination of components for use in a wet motor circulator, this invention comprises, with respect to its method, the steps of applying a band of adhesive about the interior surface of a sleeve member, the location of the adhesive being determined by the prospective position of a first bearing support member relative to the sleeve. The bearing support members are positioned about the shaft at each end respectively of the rotor in a curing assembly fixture structurally adapted to maintain alignment of the rotor and each of the support members therein. A curable adhesive is thereafter applied to the first bearing support member. The sleeve is aligned on the axis defined by the shaft of the component subassembly and retained in a sleeve retaining member in an assembly fixture. The encapsulating sleeve is thereafter forceably ejected from the assembly fixture to envelop the component subassembly. Thereafter, the combination of the sleeve, rotor, and bearing support members, together with the curing fixture, are removed from the assembly fixture to a curing zone. Preferably, the combination is provided on a rack to be placed in an oven for curing the adhesives to secure the bearing support members to the interior of the sleeve member while maintaining the axial alignment of the bearing support members and the rotor shaft. Thereafter, the combination is used in the manufacture of wet motor circulators of a type known to the art.

The assembly fixture comprises means for retaining the curing fixture which includes an aligned array of the bearing support members and the rotor in a linear array on an axis and means for ejecting the encapsulated sleeve upon command. The ejecting means includes means for retaining the sleeve in alignment with the axis so that the sleeve may be forceably ejected onto the component subassembly while maintaining the axial alignment of the components.

BRIEF DESCRIPTION OF THE DRAWINGS

In the drawings:

FIG. 3 is an assembly fixture having extending spring members for retaining the components of FIG. 2 in position in axial alignment prior to envelopment within the sleeve according to the method of this invention;

FIG. 4 is a side view, partially in cross section, showing the subassembly of components of FIG. 2 positioned by the assembly fixture of FIG. 3;

FIG. 5 is a cross-sectional view taken through the front bearing support along line 5—5 of FIG. 4;

FIG. 6 is a diagrammatic view of an apparatus for applying curable adhesive circumferentially about the rear interior of the sleeve for securing the rear bearing support to the sleeve;

DETAILED DESCRIPTION OF THE PREFERRED EMBODIMENT

Figure 1:
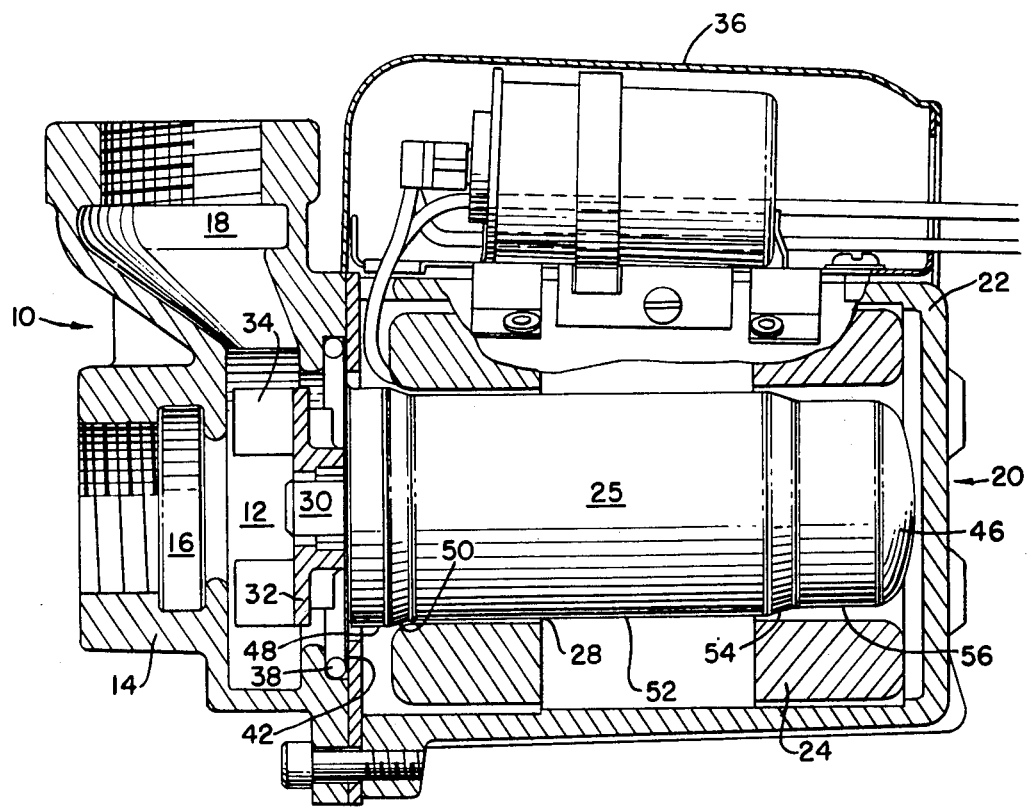
FIG. 1 is a longitudinal partial cross-sectional view of a wet motor circulator wherein the method and apparatus for assembling a subcombination of the circulator form the subject of this invention.

In FIG. 1, a wet motor circulator, designated generally by the reference numeral 10, is shown in a manner known to the art and this invention is related to an improved method and apparatus for assembling such a wet motor circulator.

The pump 10 includes a pumping chamber 12 which is formed in a pump chamber casing 14 having an inlet passage 16 and an outlet passage 18. A pump motor, designated generally by the reference numeral 20, is connected to the pump casing 14 and comprises a pump motor housing 22 containing a stator 24 and a rotor 26 (shown in FIG. 2). The stator 24 has a centrally located co-axial bore 28 within which the rotor 26 is co-axially located within a sleeve 25.

The rotor 26 is fixedly and co-axially secured to a drive shaft 30. An impeller 32, which has several impeller blades 34 fixed thereto, is keyed to the front portion of the drive shaft 30 as viewed in FIG. 1. The electrical controls for the pump motor 20 are contained at the top of the motor in a control housing 36 connected to a source of power (not shown). The pump motor housing is removably secured to the pump chamber casing 14 and is sealed against leakage at the point of attachment by an O-ring seal 38.

A fluid impermeable, generally cylindrical sleeve 25 contains and supports the rotor 26 in a proper spaced relationship to the stator 24. The sleeve 25 is firmly fitted in the stator bore 28 so that it is co-axially aligned with the stator. The sleeve 25 has a flange 42 at the front end thereof which has an opening 44. The rear end 46 of the sleeve 25 is closed and is dome-shaped in order to enable the container to better withstand internal pressures.

Due to the combined effects of the co-axial location of the rotor 26 within the sleeve 25, as well as the uniform wall thickness of the sleeve, the rotor is co-axially aligned within the stator 24 and an effective, accurately determined, air gap exists within the rotor 26 and the stator bore 28. The sleeve 25 is formed of a material with low magnetic permeability, such as austenitic stainless steel.

The sleeve 25, while generally cylindrical, has a cylindrical portion 48 adjacent the flange 42 (for receiving a first bearing support therein), a frustroconical portion 50, a central cylindrical portion 52, a frustroconical rear portion 54, and a cylindrical rear portion 56 (for receiving a second bearing support therein) which is closed by the dome-shaped end portion 46.

Figure 2:
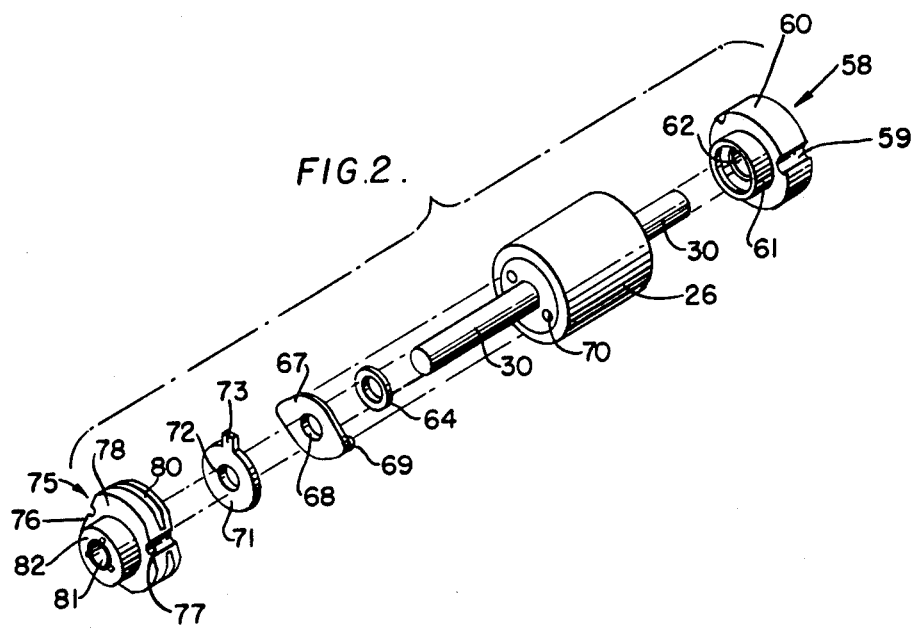
FIG. 2 is a exploded perspective view of the components of the wet motor circulator of FIG. 1 which are located within a sleeve.

It is a feature of this invention to provide an improved method for assembling the components shown in FIG. 2 within the sleeve 25 prior to the assembly of the remaining components of the wet motor circulator 10. Specifically, the sleeve 25 includes therein a rear bearing support member 58 within which the rear portion of the shaft 30 secured to the rotor 26 is rotatable. The rear bearing support member 58 includes a plurality of axially-spaced indents 59 about the periphery of the main axially-extending body 60 of the support member 58. The forward portion 61 of the support 58 is axially-extending and annular-shaped and the forwardmost annular surface thereof is adapted to permit free rotation of the adjacent rear surface of the rotor 26. A rear bearing 62, which is cylindrical in shape, for example, a sleeve bearing, is included within a bore within the rear bearing support member 58. The internal diameter of the bearing 62 is sized to receive therein the rear portion of the shaft 30 in a freely rotatable relationship.

A washer 64, preferably made from a suitable elastomeric material, is located adjacent the forward surface of the rotor 26 about the forward portion of the shaft 30. A thrust plate 67 is mounted about the shaft 30 adjacent thereto and includes an opening 68 therein for receiving the shaft 30. The thrust plate 67 also includes a pair of rearwardly-extending projections 69 which are received in mating dimples 70 in the forward surface of the rotor 26. When the thrust plate 67 is indexed in this manner, it is caused to rotate with the rotor 26.

A thrust washer 71 having an opening 72 therein for receiving the shaft 30 is mounted adjacent the thrust plate 67 and is structurally adapted to engage freely the thrust plate 67 in a surface-to-surface contacting relationship. The thrust washer 71 includes a projection 73 to be received in one of a plurality of mating recesses (not shown) on the rear surface of the front bearing support member 75.

The front bearing support member 75 is generally circular in periphery and includes a plurality of planar cordal surfaces 76 to accommodate therein a like plurality of shims on the assembly fixture described in connection with FIGS. 3 and 4. Each of the surfaces 76 includes a recess 77 axially-extending over the width of the main body 78 of the front bearing support 75. A plurality of circumferential recesses 80 are included on the circumferential surface of the main body 78 of the front bearing support member 75 to receive a curable adhesive, as described in connection with FIGS. 7 and 8. A front bearing member 81, for example, a sleeve bearing, is included within a bore running through a forwardly-extending annular portion 82 and the main body portion 78 of the front bearing support member 75. The intended diameter of the bearing member 81 is sized to receive the shaft 30 in a rotatable relationship.

As will be described, a subassembly of components comprises at least the rear bearing support member 58, the rotor 26 mounted on the shaft 30, and the front bearing support member 75. This subassembly preferably also includes the washer 64, the thrust plate 67, and the thrust washer 71. The subassembly is located and secured within the encapsulating sleeve 25 to form an assembly of components for use in making a wet motor circulator.

FIG. 3 illustrates a curing assembly fixture, designated generally by the reference numeral 90, used in the method of assembly according to the invention. The fixture 90 includes a supporting ring member 91 having a first circumferential portion 92 and a second circumferential portion 93 having differing diameters. The portions 92 and 93 are integral and have predetermined dimensional thicknesses for use with an assembly fixture which will be described in connection with FIGS. 7 and 8. Each portion 92 and 93 defines planar annular outer surfaces which are also preferably precisely dimensioned. The portion 92 defines an opening 94 therein for receiving a press-fitted indexing pin 95 therein for indexing the curing fixture in the assembly fixture described in connection with FIGS. 7 and 8.

A sleeve 100 is press-fitted within a bore of the ring 91. The sleeve 100 includes a flange portion 101 having a generally cylindrical forwardly-extending portion 102. The portion 102 is dimensioned relative to the bore in the ring member 91 to receive fixedly a plurality of spring members 103, 104, and 105 spacedly, and preferably, equidistantly in the space intermediate the bore in the ring member 91 and the portion 102 of the sleeve 100.

The sleeve member 100 defines an upper annular surface 107 and a circumferential surface 108. The diameter of the circumferential surface 108 is sized to be tightly received within the bore of the sleeve member 91. A locating pin 110, which will be discussed later in greater detail, is precisely located in an opening 111 in the sleeve member 100. Moreover, an axially-extending locating pin 113 is also received in the outer surface of the sleeve member 100.

The curing fixture 90 in the first instance, is structurally adapted to receive the components shown in FIG. 2, as further illustrated in FIG. 4. Specifically, with the curing fixture 90 located in an upright position, the front bearing support 75 is oriented as shown in FIGS. 2 and 4 intermediate the shims of fingers 103–105 so that the indexing pin 113 lies within the space defined by the axial opening 77 in the bearing support member 75. The front surface of the portion 82 of the bearing support 75 rests comfortably on the locating pin 110 as shown in FIG. 3. Thereafter, the thrust washer 71, the thrust plate 67, the washer 64, the rotor 26, and the rear bearing support 58 are consecutively aligned, in that order, within the shims 103–105 in a spaced relationship, indexed as shown in FIG. 2. The shaft 30 extends downwardly into the bore 109 defined by the sleeve 100 and is spaced from the walls therefroms to receive a portion of the assembly fixture as will be described.

Simultaneously with or prior to making such a subassembly, the interior surface of the sleeve 25 has a layer of curable adhesive applied thereto, for example, by an apparatus representatively shown in FIG. 6. The apparatus includes a source of adhesive (not shown) supplied through a suitable conduit 120 to a heater 121. The heated adhesive is supplied through an adhesive nozzle 123 to the interior surface of the sleeve 25. A rotating chuck mechanism, shown generally by the reference numeral 125, comprises a housing 126 and a rotatable chuck 127 for gripping and securing the rear end of the sleeve 25. Upon rotation of the chuck 127, the sleeve is rotated so that a suitable layer of adhesive 129 may be supplied continuously about the inner periphery thereof. The location of the tip of the adhesive nozzle 123 relative to the interior of the sleeve 25 is determined by the prospective position of the rear bearing support. The purpose of the layer of adhesive 129 is to secure the outer circumferential surface 60 of the rear bearing support 58 to the interior of the sleeve when the sleeve is secured about the subassembly as described in connection with FIGS. 7 and 8. The adhesive is preferably supplied under pressure and may be any one of a number of commercially available curable adhesives suitable for this purpose.

Figure 7:
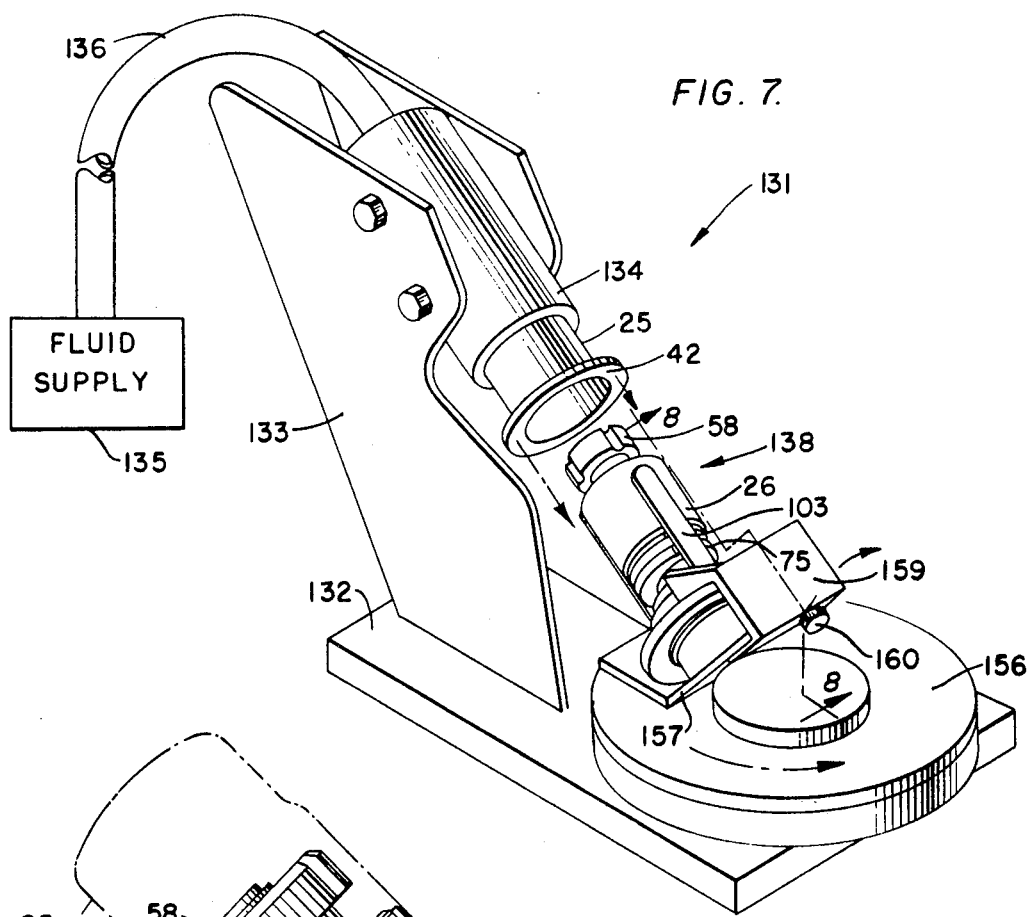
FIG. 7 is a perspective view of the assembly fixture for pneumatically applying the sleeve about the subassembly shown in FIG. 4 when mounted on the rotatable indexing base plate of the assembly fixture.

An assembly fixture, shown in FIG. 7 and designated generally by the reference numeral 131, comprises a base plate 132 and an upstanding support member 133 for retaining in a fixed angular relationship a sleeve-retaining cylinder 134. The cylinder 134 is connected to a fluid supply which may be actuated for supplying fluid, for example, air, through a conduit 136 to the sleeve retaining cylinder 134. The axis of the cylinder 134 is precisely aligned with the axis of the subassembly 138. The internal diameter of the cylinder 134 is sized to accommodate in a slip-fit relationship the sleeve 25, shown in FIG. 7 as only partially inserted into the cylinder 134. When actuated, the supply of air from the air supply 135 causes the sleeve 25 to be forceably ejected from the cylinder 134 in the direction shown by the arrows in FIG. 7 to the envelop the component subassembly 138, previously described in detail in connection with FIG. 4. Moreover, the axis of ejection is precisely aligned with the axis of the subassembly to provide precise axial alignment.

The assembly fixture 131 further includes indexing plate 156 having an angled bracket 157 secured as by bolts 158 thereto. A hinged clasp 159 is pivotally secured to the angled plate 157 as by the bolt 160 to secure the portion 92 of the curing fixture 90 and to permit its insertion and removal from the assembly fixture 131.

A shouldered annular alignment member 162 having a bore 163 therein is secured to the angled plate 157. The bore 163 is sized to receive comfortably, but in a secure, stabilizing relationship, the extending shaft 30 of the component subassembly 138. The shoulder 164 of the alignment member 162 is dimensioned to receive in precise alignment the lower surface of the sleeve member 100 of the component subassembly 138. The angle of the plate 157 is arranged so that the axis of the bore 163, the axis of the shaft 30 and hence the axis of the entire component subassembly 138 are accurately aligned.

Figure 8:
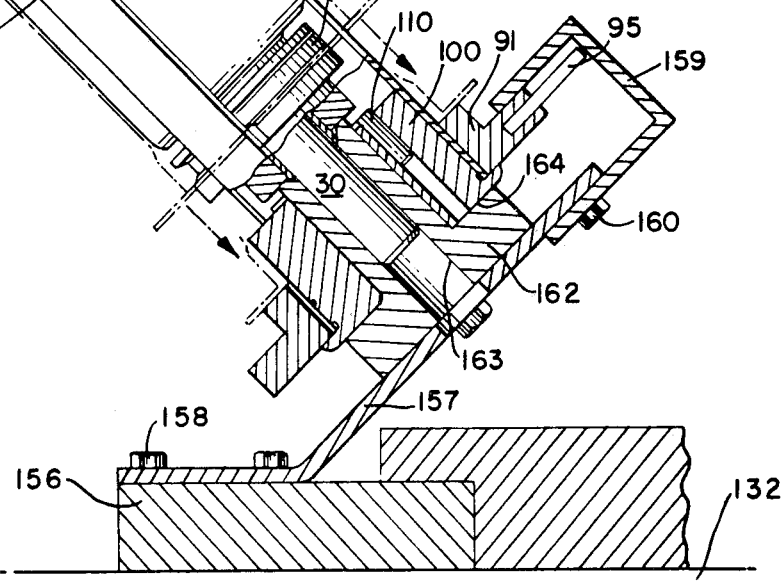
FIG. 8 is a side cross-sectional view, taken along line 8—8 of FIG. 7, showing the sleeve in phantom partially enveloping the component subassembly in the assembly fixture.

When positioned in the manner shown in FIGS. 7 and 8 or prior thereto, if desired, an additional layer of adhesive is applied to the recesses 80 in the front bearing support member 75 for securing the member to the front portion of the sleeve 25 after the sleeve is positioned by the action described in connection with FIG. 7.

The height of the upper surface of the locating pin 110 relative to the upper annular surface of the alignment member 142 is such that the difference therebetween will define a precise axial slip in the components of the subassembly when removed from the assembly fixture. As shown in FIG. 8, when the annular portion 82 of the front bearing support member 81 rests on the upper annular surface of the alignment member 162, a gap exists relative to the locating pin 110. That gap is sized to a dimension, for example, about 0.020 inches, to build into the component subassembly an axial tolerance of about this amount after the subassembly is removed from the plate, permitted by the axial slip in the subassembly before the adhesive is cured or sets.

Figure 9:
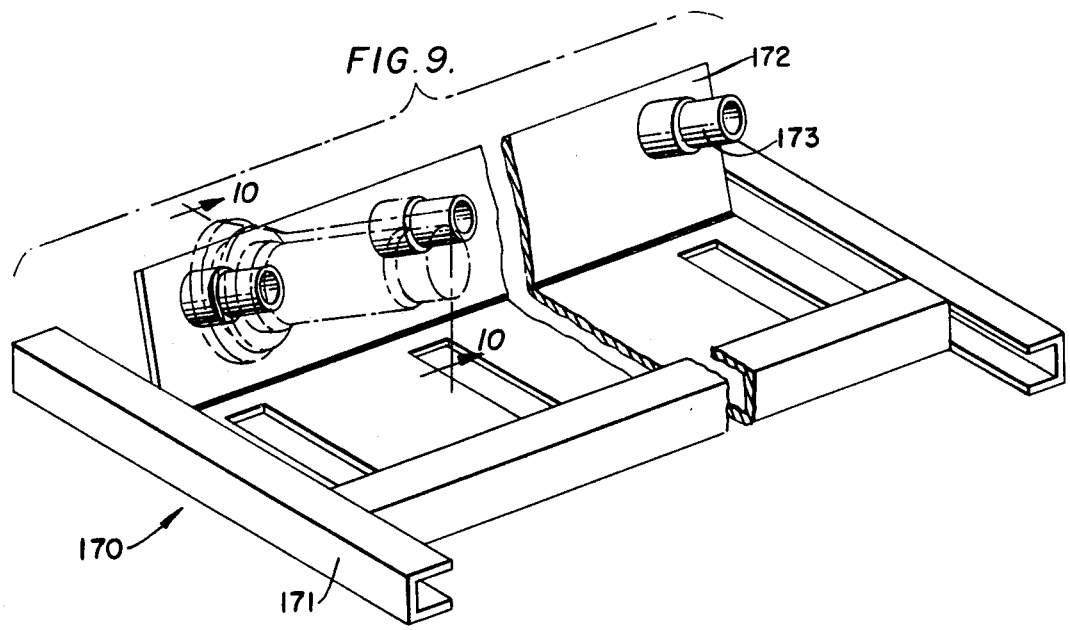
FIG. 9 is a perspective view of a portion of a curing rack for retaining the final subassembly in position during curing.
Figure 10:
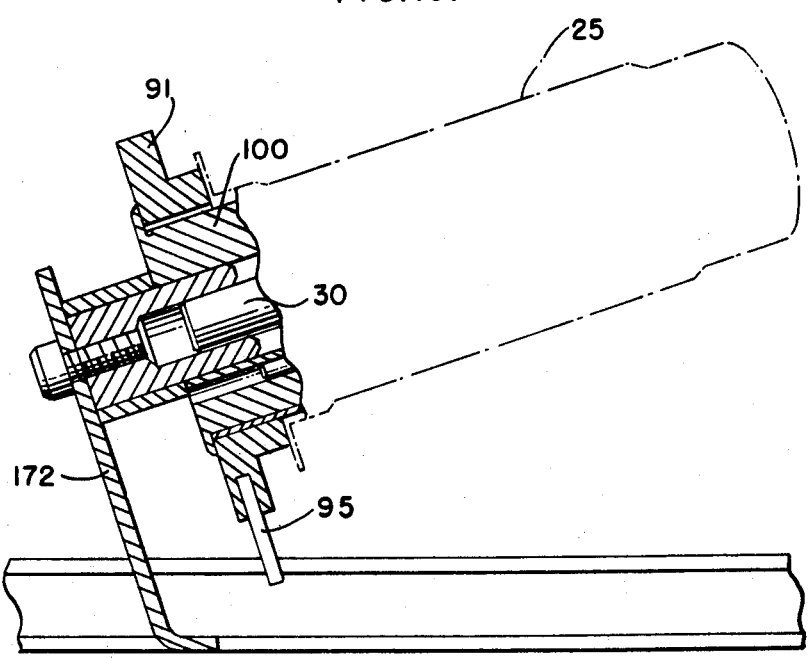
FIG. 10 is a cross-sectional view, partially in phantom, taken along line 10—10 of FIG. 9 showing the assembly in position on the curing rack.

The angle of alignment of the axis of the component subassembly 138 relative to the horizontal, as determined by the angle of the bracket 157, is preferably in the range of about 13° to about 22°, with the range of 17½° to 18½° being most preferred. This range is preferred as a function of the center of gravity of the parts, and the coefficient of friction between the bearings and the shaft. The preferred angle permits the parts to rest secured adjacent each other under the influence of gravity while yet being axially aligned in large measure by the shims 103-105. Thus, once the parts are aligned by the fixture, and the sleeve is secured thereon, as described the parts are held in alignment while curing, for example, in a curing zone, by a fixture such as that shown in FIGS. 9 and 10. The curing fixture in FIGS. 9 and 10, shown generally by the reference numeral 170, includes a suitable base support 171 having a plurality of plates 172 located thereon. A plurality of shouldered projecting members 173 are secured to the plate 172, each of which is sized to receive the component subassembly with the curing fixture attached, as shown in FIG. 10. The entire curing assembly 170, as shown in FIGS. 9 and 10, may be placed in an oven for curing, under appropriate conditions of temperature and humidity, the adhesive to secure an effective bond between the front and the rear bearing supports in the interior of the sleeve member 25 while maintaining a precise axial alignment therebetween.

After the assembly is cured, the curing fixture 90 is easily removed by withdrawing the shims 103, 104, and 105 from the space intermediate the sleeve 25 and the rotor 26. In the alternative, the shims could assume different shapes, for example, longitudinally corrugated. Thereafter, the component subassembly is used as a unit in the manufacture of the wet motor circulator ultimately manufactured.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

I claim:

1. An apparatus for assembling a subcombination of components for use in a circulator, said subcombination comprising at least a sleeve, a rotor secured to a shaft, a first bearing support member and a second bearing support member, each of said bearing support members including support bearings for receiving said shaft, the apparatus comprising:
    means for retaining a curing fixture which in turn supports said rotor and said first and said second bearing support members about said shaft and said rotor in a linear array on an axis; and
    means for ejecting said sleeve upon command, said ejecting means including means for retaining said sleeve in alignment with said axis so that upon command said sleeve is forceably ejected onto said component subassembly.

2. The apparatus as set forth in claim 1 wherein said sleeve retaining means includes a sleeve-retaining member in fluid circuit with an actuatable source of fluid for retaining said sleeve in alignment with said component subassembly and ejecting said sleeve to encapsulate said subassembly under the influence of said fluid.

3. The apparatus as set forth in claim 1 wherein said curing fixture retaining means include means for removably securing said curing fixture.

4. The apparatus as set forth in claim 2 wherein said curing fixture retaining means include means for aligning said axis of said subassembly and said curing fixture with the axis of said sleeve retaining means.

* * * * *